United States Patent [19]

Cottier et al.

[11] 4,208,445

[45] Jun. 17, 1980

[54] FOOD FATS

[75] Inventors: Derek Cottier, London; John B. Rossell, Loughton, both of England

[73] Assignee: Lever Brothers Company, New York, N.Y.

[21] Appl. No.: 923,512

[22] Filed: Jul. 10, 1978

Related U.S. Application Data

[63] Continuation of Ser. No. 756,447, Jan. 3, 1977, abandoned, which is a continuation of Ser. No. 686,962, May 14, 1976, abandoned, which is a continuation of Ser. No. 528,367, Nov. 29, 1974, abandoned.

[30] Foreign Application Priority Data

Dec. 4, 1973 [GB] United Kingdom ............... 56166/73

[51] Int. Cl.$^2$ ............................................... A23D 5/00
[52] U.S. Cl. .................................................... 426/607
[58] Field of Search ....................... 426/600, 606, 607

[56] References Cited

U.S. PATENT DOCUMENTS

| | | |
|---|---|---|
| 2,667,418 | 1/1954 | Barsky et al. .................... 426/607 X |
| 2,726,158 | 12/1955 | Cochran et al. ...................... 426/607 |
| 2,783,151 | 2/1957 | Cochran et al. ................. 426/607 X |
| 2,936,238 | 5/1960 | Weiss ..................................... 426/607 |
| 3,085,882 | 4/1963 | Gooding et al. ..................... 426/607 |
| 3,361,568 | 1/1968 | Kidger ............................. 426/660 X |
| 3,396,037 | 8/1968 | Bell et al. ............................. 426/607 |
| 3,595,673 | 7/1971 | Seiden .................................. 426/607 |

*Primary Examiner*—Robert A. Yoncoskie
*Attorney, Agent, or Firm*—James J. Farrell; Melvin H. Kurtz; Michael J. Kelly

[57] ABSTRACT

A hard butter for confectionery use has an Iodine Value of at most 20, a maximum slip melting point of about 45° C., a dilatation at 20° C. of at least 900 and the combined fatty acid composition in random distribution of a blend of a lauric fat with a smaller amount of a non-lauric, $C_{16}$–$C_{18}$ edible fat. Preferably the fats are coconut oil and a stearine of a palmitic fat i.e. a palm fat or cottonseed oil having an Iodine Value from 5 to 40.

1 Claim, No Drawings

FOOD FATS

This is a continuation of application Ser. No. 756,447, filed Jan. 3, 1977, which is a continuation of Ser. No. 686,962, filed May 14, 1976, which is a continuation of Ser. No. 528,367, filed Nov. 29, 1974, all now abandoned.

BACKGROUND OF THE INVENTION

1. Field of the Invention

The traditional use of cocoabutter in the confectionery trade for the preparation of fat-based products, for example candies, couvertures and biscuit cream fillings, has become prohibitively expensive for many purposes. The use of substitutes has in consequence spread widely, particularly of fats based on palm kernel oil, to the extent indeed that alternatives to these have been sought.

The present invention provides confectionery fats which are based on lauric fats and which exhibit very satisfactory performance in the contexts to which palm kernel-based confectionery fats are applied, notably in couvertures, biscuit filling creams and toffee. The confectionery fats of the invention however, in addition to lauric fat, also contain a smaller amount of a stearine of a $C_{16}$–$C_{18}$ edible fat, particularly a vegetable fat and especially a palm fat, ie palm oil itself or cottonseed oil. Thus, less palm kernel oil is needed in the fat provided by the invention and indeed alternative lauric fats may be used, thus dispensing altogether with palm kernel oil. Coconut oil and coconut-paring oil in particular may be used as the alternative lauric fat, providing a valuable alternative in circumstances in which palm kernel oil is scarce or expensive and coconut oil abundant.

The invention also provides an effective outlet for stearines of non-lauric fats as secondary products obtained from crystallisation, fractionation or winterisation processes applied primarily to obtain lower-melting components. Fractionation is often the most expensive operation applied to edible fats and higher-melting stearine fractions left after separating the primary products required are frequently an embarrassment with no premium demand for them. Thus, stearines are recovered from winterisation or fractionation in the preparation of frying or salad oils, and others from more complex solvent-fractionation operations in the preparation of cocoabutter substitutes from palm oil. Stearine fractions may also be provided by directed interesterification processes in the modification of fats to segregate their more highly unsaturated fatty acids in a liquid fraction, for example as a component rich in dietetically valuable polyunsaturated fats for dietary purposes as in margarine. Moreover, certain vegetable oils suffer oxidative instability which is commonly curbed by hydrogenation to eliminate as far as possible those constituents containing three or more olefinic centres. As a result however the properties of the oil may be unduly modified and although this can be overcome by crystallisation fractionation the stearine fraction removed requires disposal. This secondary product can be used in the products of the invention.

The process steps by which the products of the invention are prepared are conventional. Crystallisation and fractionation to obtain a stearine may be by dry, solvent, or so-called Lanza fractionation employing an aqueous surfactant dispersion. Hydrogenation which may be necessary to provide a stearine component in vegetable oils, many of which are limpid at ambient temperatures, is preferably selective. On the other hand, further hydrogenation, either of one or both components before they are blended, or of the blend before or after randomisation, is preferably non-selective. Randomisation is a well-established processing step in the course of which the combined fatty acids of a fat are redistributed randomly on a statistical basis. Although strictly speaking a post-randomisation hydrogenation step can alter the random distribution by altering the composition of the fat, in practice any such change that may be effected is too small to result in material changes in physical characteristics brought about by the randomisation.

2. The Prior Art

The use of lauric fats in the confectionery trade is extensively disclosed. Barsky U.S. Pat. No. 2,667,418 discloses hard butters obtained by esterifying with glycerol a mixture of saturated fatty acids selected to give predetermined melting characteristics. The composition is inconvenient to obtain however, because it requires a blend of free fatty acids initially obtained by saponification of fats and subsequent separation into individual acids by distillation fractionation. This must be carried out at temperatures exceeding 200° C. for the principal acids and in consequence exercises a highly undesirable tendency on the fats to isomerise.

Seiden U.S. Pat. No. 3,494,944 similarly proposes fractional distillation of randomised triglyceride compositions, incurring the same disadvantage as Barsky. For edible purposes the structure of naturally occurring fatty acids should be maintained as far as possible. In particular they are almost wholly devoid of branching in the fatty acid carbon chain structure. Process steps such as the application of higher temperatures, likely to lead to branching should therefore be avoided.

A margarine hardstock is disclosed in British Patent 1,245,539 containing more palm-based fat than lauric fat. Interesterified blends of lauric fat with lard are disclosed in U.S. Pat. No. 2,692,721 and Canadian Pat. No. 800,561. Randomised blends of various lauric fats with greater amounts of non-lauric fats are disclosed in U.S. Pat. No. 2,859,119.

U.S. Pat. No. 2,783,151 Cochran discloses randomised blends of cottonseed oil and coconut oil, or their stearines. The rearranged mixtures or their individual fat constituents are subjected to a replacement reaction with free fatty acids to distil off their lower fatty acid components at high temperatures, which again are conducive to chain branching in the fatty acid residues remaining in the modified fats. Cochran fails to teach the preparation of satisfactory hard butters containing significant quantities of stearine, without this clumsy and undesirable subsequent replacement, yet without it his rearranged blends exhibit melting characteristics which are too high for satisfactory hard butters.

This invention relates to edible fat compositions suitable for use in confectionery, especially in couverture formulations intended for marketing in tropical climates.

Cocoabutter is in general too expensive to be used in the manufacture of chocolate intended for couvertures and other hard butters are used in the confectionery industry. The melting requirements for these hard butters are less critical than those which must be met in the manufacture of block chocolate and high grade confectionery. Nevertheless, couverture chocolate compositions require a fat component having a slip melting point of not more than about 42° C., so that the product will not be waxy or chewy in the mouth. At the same time, the composition should be substantially solid at temperatures at which it is normally handled and if possible exhibit a solids content of at least 40% at 20° C., corresponding to a dilatation at that temperature of at least 1,000. In tropical climates this latter requirement may be appreciably greater. The dilatations discussed in this specification are measured in accordance with the method described in British Pat. No. 859,769.

Hardened palm kernel oil is widely used as hard butter for couvertures. The present invention provides an alternative fat composition enabling other lauric fats to be used in conjunction with palm fat, which is cheap and plentiful.

The present invention provides a hard butter composition suitable for use in confectionery, having the fatty acid composition randomly distributed of a blend of a lauric fat with a smaller amount of a stearine fraction of a non-lauric $C_{16}$–$C_{18}$ edible fat, the composition having a slip melting point of up to about 45° C. a maximum Iodine Value of about 20 and a minimum dilatation at 20° C. of about 900. More particularly the maximum Iodine Value is preferably about 12 and the minimum dilatation at 20° C. about 1200.

Preferably the stearine is a vegetable fat stearine, more preferably a palm fat stearine, ie a fraction of palm oil or cottonseed oil. Stearines of other vegetable fats which are wholly liquid at room temperature, ie above 15° C., may be obtained by first hardening the oil by decrease of about 20 Iodine Value units and fractionating a stearine from the hardened oil. Stearines may also be made by low temperature directed interesterification of liquid oils from which they may be separated by conventional crystallisation fractionation methods.

The stearine fractions should preferably have an Iodine Value of from 5 to 40 and slip melting points from 40° to 60° C., preferably 45° to 60° C. They may be obtained by dry fractionation, solvent fractionation or by the so-called Lanza method utilising aqueous surfactant dispersions to separate fat crystals from liquid fats in the fractionation process.

Suitable oils from which the stearine fractions may be obtained include sunflower, safflower, groundnut and soyabean oils. These oils may also be present in the compositions of the invention in whole, hydrogenated form.

The lauric fat component may be provided by any of the naturally occurring lauric fats, alone or in blends with one another, for example coconut oil, palm kernel oil, babassu or tucum oil, the first being preferred. The lauric component may also be provided by crystallisation fractions of these oils or their hydrogenation products. Coconut-paring oil is particularly preferred, being the oil extracted from the inner part of the pericarp. It contains a high proportion of coconut oil but has a higher Iodine Value, about 25, compared with about 9 for coconut oil itself. It is in plentiful supply in the Philippines and Ceylon, parts of India and Japan.

The compositions of the invention are preferably constituted by at least 15% of the stearine component. Smaller quantities exercise insufficient influence on the properties of the product, while on the other hand amounts of 50% or more result in an unduly high-melting product having a chewy taste. Between these limits the proportions may be varied in accordance with the characteristics of the two components and the ambient conditions in which they are marketed and/or used. Other things being equal, a high proportion of palm fat stearine, eg 30 to 45%, confers a harder characteristic on the product which is valued in tropical countries. As a rough guide, an increase of 10% in the level of stearine is compensated for by a 5-unit increase in Iodine Value, the slip melting point remaining more or less unchanged.

The Iodine Value requirement ensures adequate hardness in the product. The particular value adopted in each case is related to the intended use of the product. For hard butters for couvertures preferably the maximum Iodine Value is 12. This assures a sufficiently high dilatation at 20° C. of at least 1200, but for this purpose higher amounts of lauric fats may require lower Iodine Values, down to zero. For toffee fats a minimum dilatation at 20° C. of 900 is sufficient and a range from 10 to 18 is preferred for the Iodine Value.

The products of the invention are prepared by a process comprising blending, fractionation, interesterification and if necessary hydrogenation carried out and applied in appropriate order to lauric and non-lauric edible $C_{16}$–$C_{19}$ fats as necessary.

Hydrogenation to achieve the required Iodine Value may be applied to either of the components separately, or to the blend before or after randomisation. A final hydrogenation step may assist with decolourising the product. Hydrogenation is preferably non-selective, using fresh nickel catalyst. Strictly speaking a final hydrogenation step may marginally disturb the complete randomisation, but the change in composition is very slight and has little effect on physical properties.

Interesterification is carried out in the presence of a small amount of an alkali metal catalyst, eg the metals themselves or lower alkali metal alkoxides containing up to 4 carbon atoms. Preferably a temperature within the range 50° to 150° C. is adopted. Temperatures of about 200° C. and above should not be used as the triglycerides start to decompose or isomerise at these temperatures. The reaction is usually completed within a very short time, but it is preferred to maintain the blend under reaction conditions for from about ¼ hour to 4 hours. The catalyst is then destroyed and removed by aqueous washes from which the fat may be separated and dried.

The hard butters of the present invention may be formulated in couverture or other confectionery compositions in the customary manner. Usually the fat is blended with a similar quantity of icing sugar, together with a little chocolate colouring and flavouring, preferably provided by up to 20% cocoa powder of reduced fat content.

EXAMPLE 1

A palm stearine having a slip melting point of 48° C. and an Iodine Value of 42 was obtained by dry fractionating crude palm oil of Iodine Value 52. The oleine was discarded and the stearine residue neutralised and dried to a free fatty acid level less than 0.1% and a maximum moisture content 0.02%.

A blend was prepared with 35% of the palm stearine and 65% of refined coconut oil of Iodine value 8 and similarly low moisture and free fatty acid content.

The blend was interesterified at 110° C., using 0.3% sodium methoxide as catalyst, which was removed after ¼ hour, when the reaction was complete.

The blend was washed and dried and found to have a slip melting point of 31° C. It was hydrogenated with 1% fresh supported nickel catalyst at 180° C. and 20 to 30 psig, in stages to provide a series of products of varying Iodine Values and melting characteristics as shown in Table I, which includes the corresponding characteristics for the unhydrogenated sample. The combined fatty acid analysis of the final product was as follows:

| | | |
|---|---|---|
| Saturated $C_6$ | | 0.4 |
| $C_8$ | | 6.9 |
| $C_{10}$ | | 4.8 |
| $C_{12}$ | | 29.5 |
| $C_{14}$ | | 11.3 |
| $C_{16}$ | | 24.9 |
| $C_{18}$ | | 18.4 |
| | | 96.2 |
| $C_{18}$ unsaturated Mono | | 3.8 |
| Di | | trace |

TABLE I

| Product | I.V. | Slip M.Pt. °C. | Dilatations o °C. | | | | |
|---|---|---|---|---|---|---|---|
| | | | $D_{20}$ | $D_{25}$ | $D_{30}$ | $D_{35}$ | $D_{40}$ |
| 1 | 9.2 | 34.7 | 1275 | 980 | 555 | 140 | 20 |
| 2 | 7.4 | 36.1 | 1355 | 1100 | 630 | 200 | 25 |
| 3 | 6.1 | 36.6 | 1405 | 1155 | 695 | 250 | 25 |
| 4 | 5.2 | 37.1 | 1440 | 1170 | 770 | 285 | 25 |
| 5 | 4.4 | 37.9 | 1465 | 1230 | 785 | 370 | 35 |
| 6 | 3.3 | 39.2 | 1505 | 1255 | 870 | 355 | 60 |

Of the entries in Table I, all were suitable, but those with Iodine Values 4 to 8 were preferred, those below this range providing a less satisfactory oral response, evident from the high slip melting point. By contrast with this example, corresponding samples, both hydrogenated and unhydrogenated, were prepared, with Iodine Values above 12. These were unsatisfactory, with dilatations below 1000 at 20° C.

Satisfactory couvertures were prepared according to the formulation in Table II.

TABLE II

| | Milk Formulation | Dark Formulation |
|---|---|---|
| Cocoa Powder (10–12% fat content) | 5.0 | 21.0 |
| Sugar | 43.0 | 45.0 |
| Skimmed Milk Powder | 16.5 | — |
| Fat | 35.5 | 34.0 |
| | 100.0 | 100.0 |
| Lecithin | 0.45 | 0.45 |
| Vanillin | 0.07 | 0.07 |
| Salt | 0.05 | — |

EXAMPLE 2

A palm stearine of slip melting point 44° C. and Iodine Value ca. 30 obtained by Lanza fractionation, was blended in the proportions 35:65 with coconut oil, interesterified and hydrogenated as described in Example 1, to provide a product of Iodine Value 6.3 and slip melting point 37.0° C. Its dilatation values were: $D_{20}$ 1380, $D_{25}$ 1060, $D_{30}$ 610, $D_{35}$ 200 and $D_{40}$ 20. The product was incorporated into couvertures as described in Example 1 and found to be satisfactory.

EXAMPLE 3

10 parts of a stearine fraction of Iodine Value 8, slip melting point 58° C., obtained by fractionation (twice) of palm oil from acetone at 18° to 20° C., were blended with 90 parts of an oleine of Iodine Value 22, obtained by Lanza fractionation of palm kernel oil and the blend interesterified and hydrogenated as described in Example 1, except that the hydrogenation was substantially complete, the Iodine Value of the product being only 0.4. Its slip melting point was 38.0° C.

The product was again satisfactory, its dilatation values being: $D_{20}$ 1590, $D_{30}$ 875, $D_{35}$ 320 and $D_{40}$ 35.

Satisfactory products could also be obtained by hydrogenation as described, to Iodine Values 3, 5 or 8, of interesterified blends of 35 parts of the solvent-fractionated palm stearine, either with 65 parts whole coconut oil, or with 30 parts coconut oil and 35 parts of the palm kernel oleine.

EXAMPLE 4

Palm oil was fractionated twice from acetone, at 0° C. and 19° C., and a stearine fraction recovered of Iodine Value 10 and slip melting point 58° C.

10 parts of the stearine were blended with 65 parts coconut oil and 25 parts palm oil. The blend had an Iodine Value of 19.2 and was interesterified and hydrogenated as previously described, to give a product of Iodine Value 6.1 and slip melting point 36.9° C. The dilatation values of the product were: $D_{20}$ 1500, $D_{25}$ 1220, $D_{30}$ 805, $D_{35}$ 325 and $D_{40}$ 25.

A further product was prepared by blending 30 parts of the same palm stearine with 10 parts coconut oil and 60 parts fully hydrogenated coconut oil. The blend had an Iodine Value 4.5 and after interesterification but without further hydrogenation had a slip melting point 36.1° C. and the following dilatation values: $D_{20}$ 1435, $D_{25}$ 1185, $D_{30}$ 765, $D_{35}$ 220 and $D_{40}$ 20.

Both products were found to be satisfactory in the couverture formulations of Table II.

EXAMPLE 5

A blend of 35/65 dry fractionated palm oil of slip melting point 48° C. and Lanza-fractionated palm kernel oil, slip melting point 22° C. was randomly interesterified at 115° C., using 0.4% sodium methoxide catalyst, giving a product of slip melting point 30° C. The catalyst was removed and the interesterified blend was then hydrogenated as described in Example 1, to an Iodine Value of 15. The characteristics of the product were as follows:

| I.V. | Slip M.Pt. | $D_{20}$ | $D_{25}$ | $D_{30}$ | $D_{35}$ | $D_{40}$ |
|---|---|---|---|---|---|---|
| 14.7 | 35.2° C. | 1260 | 1010 | 555 | 14 | 10 |

The product was deodorised by steam injection for 5 hours at about 180° C. and 1 mm Hg pressure and tested in biscuit cream. This was prepared by blending the fat with an equal amount of coconut oil and mixing 40% of the softened blend with 60% icing sugar with stirring. The adhesion of the biscuit cream on biscuits was found satisfactory and it exhibited a quick, non-greasy meltdown in the mouth.

The deodorised product was also mixed and heated in a stirred vertical toffee boiler at about 120° C. for 18 minutes, with twice its weight of each of granulated sugar, corn syrup and condensed milk, with a little water and salt and vanilla added for flavour. After setting, the toffee obtained was found to have a satisfactory mouth-feel with good set-up.

EXAMPLE 6

Cottonseed oil was solvent-winterised to give a cottonseed stearine of IV 73.2 and it had the following fatty acid composition:
Myristic acid: 0.4%
Palmitic acid: 49.8%
Stearic acid: 1.5%
Oleic acid: 11.7%
Linoleic acid: 36.5%

Palm kernel oil was Lanza-fractionated to give a palm kernel oleine of IV 20.9 with the following fatty acid composition:
Caproic: 0.2%
Caprylic: 4.6%
Capric: 4.1%
Lauric: 45%
Myristic: 12.5%
Palmitic: 8.6%
Stearic: 2.9%
Oleic: 19.7%
Linoleic: 2.3%

25% of the cottonseed stearine was interesterified with 75% of palm kernel oleine to give an oil of IV 34. This oil was hydrogenated to give samples in the range of IV between 17 and 3. These samples had the following properties:

| IV | $D_{20}$ | $D_{25}$ | $D_{30}$ | Slip M.Pt. °C. |
|---|---|---|---|---|
| 17 | 960 | 645 | 275 | 32.4 |
| 13 | 1135 | 805 | 415 | 33.9 |
| 8 | 1340 | 1015 | 620 | 36.2 |
| 3 | 1520 | 1230 | 865 | 38.8 |

EXAMPLE 7

Palm oil was dry-fractionated to produce a liquid oil for frying purposes and a stearine residue of IV 43.

80% of coconut-paring oil was interesterified with 20% of the stearine obtained by dry fractionation of palm oil. The interesterified mixture had an IV of 24.5 and the following fatty acid composition:
Caproic: 0.4%
Caprylic: 4.4%
Capric: 3.8%
Lauric: 28.6%
Myristic: 11.1%
Palmitic: 23.4%
Stearic: 3.8%
Oleic: 20.0%
Linoleic: 4.2%
Arachidic: 0.1%

The interesterified mixture was neutralised and hydrogenated to give samples with the following properties:

| IV | $D_{20}$ | $D_{25}$ | $D_{30}$ | $D_{35}$ | Slip M.Pt. °C. |
|---|---|---|---|---|---|
| (Feedstock | | | | | |
| 24.5 | 675 | 360 | 125 | 30 | 30.6) |
| 15 | 1180 | 835 | 455 | 105 | 34.0 |
| 12 | 1315 | 980 | 595 | 170 | 35.3 |
| 7.5 | 1510 | 1215 | 805 | 305 | 37.5 |
| 5 | 1610 | 1345 | 940 | 380 | 38.8 |
| 3 | 1680 | 1450 | 1055 | 460 | 39.9 |

All the hydrogenated samples from Examples 6 and 7 gave satisfactory performance in couvertures.

What is claimed is:

1. A confectionery fat having a slip melting point up to about 45° C., a maximum Iodine Value of about 20 and a minimum dilatation at 20° C. of about 900 comprising a randomly rearranged mixture of a lauric fat selected from the group consisting of palm kernel, coconut and coconut-paring oil and from at least 15% to less than 50% of a stearine fraction having an Iodine Value from 5 to 50 and a slip melting point from 40° to 60° C. obtained from a fat selected from the group consisting of palm and cottonseed oils and their hydrogenated derivatives.

* * * * *